United States Patent Office 3,555,032
Patented Jan. 12, 1971

3,555,032
PROCESS FOR THE MANUFACTURE OF 2,3,4,5-TETRACHLOROPYRIDINE
Howard Johnston, Walnut Creek, Calif., assignor to The Dow Chemical Company, Midland, Mich., a corporation of Delaware
No Drawing. Filed Mar. 22, 1968, Ser. No. 715,147
Int. Cl. C07d 31/26
U.S. Cl. 260—290                                5 Claims

ABSTRACT OF THE DISCLOSURE

The process for the manufacture of 2,3,4,5-tetrachloropyridine which comprises contacting chlorine with a 2-chloropyridine hydrochloride composition. 2,3,4,5-tetrachloropyridine is useful as an antimicrobial and as an intermediate for the production of 2,3,5-trichloro-4-pyridinol.

BACKGROUND OF THE INVENTION 2,3,4,5-tetrachloropyridine is prepared in known methods by chlorinating pyridine saturated with hydrogen chloride at temperatures of from about 115°–120° C. The chlorination is a tedious procedure carried out over a period of from several days to several weeks and results in the formation of a mixture consisting of a tarry polymeric material and an oily liquid. The tarry polymeric material usually constitutes from about 60 to 70 percent or more of the reaction product. The oily liquid portion contains the desired 2,3,4,5-tetrachloropyridine which may be separated by fractional distillation under reduced pressure and obtained in amounts of from about 60 to 70 percent of said oily liquid portion. This corresponds to yields of from about 20 to 30 percent of 2,3,4,5-tetrachloropyridine based upon the pyridine employed in its preparation.

2,3,4,5-tetrachloropyridine is a colorless liquid freezing at about 22° C. and boiling at about 250.5°–251.5° C. at atmospheric pressure. The product is useful as an antimicrobial for the control of a number of undesirable bacterial and fungal organisms such as *Staphylococcus aureus*, *Aspergillus terreus* and *Pullularia pullulans*. 2,3,4,5-tetrachloropyridine is also useful as an intermediate for the production of 2,3,5-trichloro-4-pyridinol. The latter pyridinol compound and its salts are materials more recently found to be of outstanding value for the regulation of the growth of plants and particularly for the control of the growth and the killing of undesirable plant species. In such use, the 2,3,4,5-tetrachloropyridine is hydrolyzed with sodium hydroxide in a reaction medium such as water or an inert organic solvent such as benzene. Accordingly, it is believed evident that an improved method for the manufacture of 2,3,4,5-tetrachloropyridine is desirable in order to provide for adequate quantities of the desirable 2,3,5-trichloropyridinol-type plant growth regulants.

OBJECTS OF THE INVENTION

It is an object of the present invention to provide a new and improved method for the production of 2,3,4,5-tetrachloropyridine. It is a further object to provide a method which is more economical than known methods and gives yields of the 2,3,4,5-tetrachloropyridine substantially free of tarry by-products and far in excess of those previously obtained in known methods. An additional object is the provision of a method which gives the desirable and high yields of the 2,3,4,5-tetrachloropyridine in a reasonable period of time. Another object is the provision of an improved method which may be carried out in a continuous manner for the manufacture of 2,3,4,5-tetrachloropyridine. Other objects will become apparent from the following specification and claims.

SUMMARY OF THE INVENTION

The present invention is directed to the process which comprises contacting chlorine with a 2-chloropyridine hydrochloride composition to effect the chlorination of the 2-chloropyridine hydrochloride. The chlorination may be carried out in an inert organic liquid as reaction medium and preferably a liquid in which the 2-chloropyridine hydrochloride is somewhat soluble or readily dispersible. Suitable media include pentachloropyridine, hexachlorobutadiene, orthodichlorobenzene and trichlorobenzene. The chlorination is carried out under substantially anhydrous conditions and at temperatures at which hydrogen chloride is formed and evolved as a product of reaction. Following the chlorination, the reaction mixture is neutralized, conveniently with an alkali metal hydroxide such as sodium hydroxide or potassium hydroxide, to convert any unreacted 2-chloropyridine hydrochloride to the free base. The neutralized mixture is thereafter fractionally distilled under reduced pressure to separate the desired 2,3,4,5-tetrachloropyridine. The reaction takes place smoothly under these conditions with the production of the 2,3,4,5-tetrachloropyridine product in yields of up to 70 percent or more based upon the 2-chloropyridine hydrochloride. Further, the new process is characterized as being capable of being carried out continuously and gives a reaction product with no substantial amounts of polymeric materials.

To obtain 2,3,4,5-tetrachloropyridine in accordance with the present teaching, it is critical and essential that the reaction be carried out at a temperature at which hydrogen chloride is formed up to a temperature of 135° C. Good results are obtained when operating at temperatures of from 90° to 135° C. In a preferred embodiment, the contacting and chlorination is carried out at temperatures of from 110° C. to 125° C. Temperatures substantially in excess of 135° C. should not be employed for any appreciable period of time as they materially reduce the yields of the desired 2,3,4,5-tetrachloropyridine. The reaction is conveniently carried out in a reaction vessel which resists corrosion by chlorine and hydrogen chloride. Thus, glass or silica vessels or metallic vessels lined with glass or silica are suitable.

The rate at which the formation of the tetrachloropyridine takes place has been found to vary directly with the employed temperature, the longer periods being employed at the lower temperatures. In general, chlorine is introduced and contacted with the 2-chloropyridine hydrochloride at a rate at which it provides agitation in the reaction zone. Alternatively it may be supplied at a rate at which it is substantially all absorbed and employed in the reaction zone. Good conversions of starting materials to 2,3,4,5-tetrachloropyridine are obtained in periods of from about 5 to 30 hours at temperatures above 100° C.

The rate of the reaction is also dependent upon the concentration of 2-chloropyridine hydrochloride in the reaction mixture. Thus, in practice, it is usually desirable to terminate the reaction without attempting to chlorinate completely all of the 2-chloropyridine hydrochloride introduced in a batch reaction. On termination of the reaction, the 2,3,4,5-tetrachloropyridine product is separated from unreacted 2-chloropyridine as discussed above. In this manner desirably high conversions of 2-chloropyridine hydrochloride to 2,3,4,5-tetrachloropyridine are obtained without producing undesirable amounts of unwanted by-products.

It is among the advantages of the present invention that, as the chlorination proceeds to the production of a substantial proportion of the tetrachloropyridine, the reaction mixture separates into two liquid phases. These two phases consist of a denser phase richer in the tetrachloropyridine product and a less dense phase richer in the 2-chloropyridine hydrochloride reactant. Said phase separation facilitates the operation of the reaction as a continuous process as hereinafter set forth.

The desirable results of the present invention are obtained when the chlorination is carried out with any substantial amount of chlorine. However, it is usually preferred from the standpoint of economy to obtain substantial conversion of 2-chloropyridine hydrochloride. The reaction consumes about three molecular proportions of chlorine for each molecular proportion of 2-chloropyridine hydrochloride converted. Thus, one molecular proportion of 2-chloropyridine hydrochloride is employed with at least two and usually with about three molecular proportions of chlorine. In a preferred procedure, the chlorine is employed in an amount in excess of that consumed in the reaction mixture. The use of a large excess of chlorine does not have an adverse effect upon the reaction and is only undesirable from the standpoint of economy.

In carrying out the reaction, gaseous chlorine is introduced portionwise into liquid 2-chloropyridine hydrochloride composition or a dispersion of 2-chloropyridine hydrochloride in an organic liquid as reaction medium. The addition is carried out with an amount of chlorine sufficient to provide for the consumption of about three molecular proportions of chlorine by each molecular proportion of 2-chloropyridine hydrochloride. The addition is accomplished with stirring and usually at a temperature of from 110° to 135° C. The introduction can be carried out at such a rate as to provide for the agitation of the reaction mixture.

In an alternative and convenient mode of operation, one molecular proportion of 2-chloropyridine is treated with at least 0.4 and preferably with about one molecular proportion of hydrogen chloride, or with an excess of hydrogen chloride to prepare a 2-chloropyridine hydrochloride composition. In such embodiment, it is critical and essential that one molecular proportion of 2-chloropyridine be employed with at least 0.4 molecular proportion of hydrogen chloride. Amounts substantially less than 0.4 molecular proportion should not be employed as they materially reduce the content of the desired 2,3,4,5-tetrachloropyridine in the product. When employing an excess of hydrogen chloride, the 2-chloropyridine can be saturated with the hydrogen chloride in amounts up to from about 1.5 to 1.9 molecular proportions of hydrogen chloride for each molecular proportion of 2-chloropyridine to produce satisfactory 2-chloropyridine hydrochloride starting compositions. The 2-chloropyridine hydrochloride compositions so prepared are then chlorinated in the manner as above described. In such embodiment, the chlorine is employed in an amount of about three or more molecular proportions per molecular proportion of 2-chloropyridine hydrochloride in the 2-chloropyridine hydrochloride starting composition. Upon completion of the contacting and chlorination, the reaction mixture thereafter is neutralized and the neutralized mixture washed with water and fractionally distilled under reduced pressure to separate the desired 2,3,4,5-tetrachloropyridine and to recover any unreacted 2-chloropyridine.

A particularly valuable and preferred mode of operation comprises carrying out the foregoing process as a continuous process. Thus, the reactants are introduced or metered together into a reaction zone with the temperature of the zone being maintained between about 90° and 125° or 135° C. Conveniently, one molecular proportion of 2-chloropyridine is treated with about one molecular proportion of hydrogen chloride, or saturated with hydrogen chloride (such as with from 1 to 1.9 molecular proportions of hydrogen chloride), and the resulting 2-chloropyridine hydrochloride composition together with chlorine metered into the reaction zone under such conditions as to provide for a residence time of a least one hour, or preferably, sufficient to effect substantial conversion of the 2-chloropyridine hydrochloride at the temperature employed. Good results are obtained at residence times of from about 6 to 40 hours at a temperature of about 110°–125° C. The introduction is carried out in the mole ratio of one molecular proportion of the employed 2-chloropyridine hydrochloride with about 3 or more molecular proportions or from 3 to 5–10 molecular proportions of chlorine. From the standpoint of economy, it is usually preferred to separate unreacted chlorine from effluent gas from the reactor and recycle such halogen through the reaction zone. Similarly hydrogen chloride of reaction can be recovered from the effluent gas and be recycled to form fresh 2-chloropyridine hydrochloride starting material. Alternatively, the hydrogen chloride can be oxidized to chlorine by known procedures with the resulting chlorine being recycled to the reactor.

In starting up the continuous process it is generally desirable to build up an initial charge in the reaction zone and to carry out the chlorination thereof until a substantial amount of 2,3,4,5-tetrachloropyridine product has been produced. Thereafter a portion of the reaction mixture is continuously withdrawn from the reaction zone at a rate commensurate with the rate of introduction of the 2-chloropyridine hydrochloride composition so as to maintain a substantially constant volume of reaction mixture in the reaction zone. In the preferred mode of operation wherein no solvent is employed and thus only the 2-chloropyridine hydrochloride composition and chlorine are being introduced into the reaction zone, the formation of a substantial amount of 2,3,4,5-tetrachloropyridine in the reaction mixture is evidenced by separation of the reaction mixture into two liquid phases. The denser of the two phases, which is richer in the desired tetrachloropyridine product is then selected as the portion to be continually withdrawn from the reaction zone. In any case the withdrawn product is then neutralized with aqueous base, washed with water and thereafter fractionally distilled to separate the desired 2,3,4,5-tetrachloropyridine product and to recover unreacted 2-choloropyridine for recycle.

DESCRIPTION OF SOME PREFERRED EMBODIMENTS

The following examples illustrate the present invention but are not to be construed as limiting the same.

Example 1

2-chloropyridine (113 grams; 1 mole) is saturated with stirring with about 1.5 moles of anhydrous hydrogen chloride to produce a liquid 2-chloropyridine hydrochloride product. Stirring is thereafter continued and gaseous chlorine introduced slowly portionwise therein at a temperature of from 105° to 110° C. The introduction is carried out over a period of about 9½ hours and with the reaction of about 2.5 moles of chlorine. The reaction mixture is then washed with 400 milliliters of ice water and the washed mixture thereafter neutralized with aqueous sodium hydroxide. During the neutralization, the mixture divides into an aqueous layer and an oily organic layer. The oily organic layer is separated by decantation and thereafter fractionally distilled under reduced pressure to recover the unreacted 2-chloropyridine and to obtain the 2,3,4,5-tetrachloropyridine product in a yield of 64.5 percent based upon the 2-chloropyridine converted (52.4% conversion).

Example 2

A liquid 2-chloropyridine hydrochloride composition is prepared by saturating 2-chloropyridine with stirring with anhydrous hydrogen chloride in the proportion of about 1½ moles of hydrogen chloride with each mole of 2-chloropyridine. The liquid 2-chloropyridine hydrochloride thus prepared and chlorine are metered into a reaction zone maintained at a temperature of about 115° C. and of such capacity as to provide for a residence time of about 39 hours. Initially the 2-chloropyridine hydrochloride composition is rapidly introduced until an inventory corresponding to about 29 pounds (about 114 gram-moles) of 2-chloropyridine is built up in the reaction zone. The chlorine is introduced thereinto at a steady rate of about 8.8 gram-moles (1.38 pounds) per hour. When the chlorination has proceeded for several hours the separation of a heavy liquid phase rich in 2,3,4,5-tetrachloropyridine is observed in the bottom of the reaction vessel. Thereafter the metering of chlorine is continued at the rate of about 8.8 gram-moles per hour and 2-chloropyridine hydrochloride composition is metered in at a rate corresponding to the introduction of 2.2 gram-moles of 2-chloropyridine per hour while the product containing 2,3,4,5-tetracholoropyridine is continuously withdrawn from the reaction zone at a rate adjusted to maintain a substantially constant volume in the reaction zone. The continuously-withdrawn product is neutralized with aqueous sodium hydroxide and washed with water. The washed product is then fractionally distilled under reduced pressure to separate the 2,3,4,5-tetrachloropyridine product. Analysis of the product stream by vapor-phase chromatography shows that the 2,3,4,5-tetrachloropyridine product is obtained in a yield of about 70 percent based upon the 2-chloropyridine hydrochloride converted.

Example 3

2-chloropyridine hydrochloride (300 grams; 2 moles) is warmed to a temeprature of 125° C. and maintained at 125°–130° C. while 9 moles of gaseous chlorine is introduced portionwise therein over a period of about five hours. The introduction is carried out with stirring. Following the chlorination, the reaction mixture is neutralized with aqueous sodium hydroxide, the neutralized mixture washed with water and the washed product thereafter fractionally distilled under reduced pressure to separate the 2,3,4,5-tetrachloropyridine product. The product is obtained in a yield of 60 percent based upon the 2-chloropyridine converted.

Example 4

Gaseous chlorine (5 moles) is introduced slowly portionwise with stirring into 150 grams (1 mole) of 2-chloropyridine hydrochloride dispersed in 200 milliliters of hexachlorobutadiene. The introduction is carried out over a period of about 30 hours at a temperature of from 95° to 100° C. Following the reaction, the reaction mixture is neutralized with aqueous potassium hydroxide, the neutralized mixture washed with water and the washed product thereafter fractionally distilled under reduced pressure to obtain the 2,3,4,5-tetrachloropyridine. The tetrachloropyridine is obtained in a yield of 68 percent based upon the consumed 2-chloropyridine.

Example 5

2-chloropyridine (1 mole) is treated with 0.5 mole of anhydrous hydrogen chloride to produce a liquid 2-chloropyridine hydrochloride composition. Stirring is thereafter continued and gaseous chlorine introduced slowly portionwise therein at a temperature of from 115° to 125° C. The chlorination is carried out over a period of about four hours and with the employment of about 5 moles of chlorine. The reaction mixture is then washed with 390 milliliters of ice water and further processed as described in Example 1 to obtain the 2,3,4,5-tetrachloropyridine product.

What is claimed is:

1. A process for the manufacture of 2,3,4,5-tetrachloropyridine which comprises contacting under substantially anhydrous conditions chlorine with a liquid 2-chloropyridine hydrochloride composition in proportions to provide at least two molecular proportions of chlorine per molecular proportion of said 2-chloropyridine hydrochloride in said liquid composition, said 2-chloropyridine composition comprising one molecular proportion of 2-chloropyridine and from 0.4 to 1.9 molecular proportions of hydrogen chloride, the contacting being carried out at a temperature of from 90° to 135° C.

2. The process claimed in claim 1 wherein the chlorine is contacted with a liquid 2-chloropyridine hydrochloride composition consisting essentially of 2-chloropyridine saturated with hydrogen chloride.

3. The process claimed in claim 1 wherein chlorine and said liquid 2-chloropyridine hydrochloride composition are contacted at a temperature of from 110° to 125° C.

4. A continuous process for the production of 2,3,4,5-tetrachloropyridine which comprises:

(a) continuously metering chlorine and a liquid 2-chloropyridine hydrochloride composition into a reaction zone maintained at a temperature of from 110° to 135° C., said 2-chloropyridine hydrochloride composition consisting essentially of 2-chloropyridine and from 0.4 to 1.9 molecular proportions of hydrogen chloride per molecular proportion of 2-chloropyridine and said metering being in a ratio of about 3 to 10 molecular proportions of chlorine per molecular proportion of 2-chloropyridine hydrochloride present in said composition, (b) contacting said chlorine and said liquid 2-chloropyridine hydrochloride composition in said reaction zone for at least one hour at said temperature and under substantially anhydrous conditions thereby forming a liquid mixture comprising substantial amounts of 2,3,4,5-tetrachloropyridine, and (c) continuously withdrawing said mixture from said zone at a volume rate essentially equal to that at which it is formed.

5. The process as defined in claim 1 wherein the contacting of said chlorine with said liquid 2-chloropyridine hydrochloride composition is carried out in an inert organic liquid as reaction medium, said inert organic liquid being a solvent or dispersant for 2-chloropyridine hydrochloride.

References Cited

UNITED STATES PATENTS 3,426,035    2/1969    Bremmer _____ 260—290

HENRY R. JILES, Primary Examiner

H. I. MOATZ, Assistant Examiner

U.S. Cl. X.R.

260—297; 71—94; 23—154